(12) United States Patent
Uebo et al.

(10) Patent No.: US 7,145,502 B2
(45) Date of Patent: Dec. 5, 2006

(54) DISTANCE MEASUREMENT METHOD AND DEVICE

(75) Inventors: Tetsuji Uebo, Wakayama (JP); Tadamitsu Iritani, Tokushima (JP)

(73) Assignee: Shima Seiki Manufacturing Limited, Wakayama (JP)

( * ) Notice: Subject to any disclaimer, the term of this patent is extended or adjusted under 35 U.S.C. 154(b) by 51 days.

(21) Appl. No.: 10/506,014

(22) PCT Filed: Jun. 4, 2003

(86) PCT No.: PCT/JP03/07060

§ 371 (c)(1),
(2), (4) Date: Aug. 30, 2004

(87) PCT Pub. No.: WO03/104841

PCT Pub. Date: Dec. 18, 2003

(65) Prior Publication Data

US 2006/0023571 A1   Feb. 2, 2006

(30) Foreign Application Priority Data

Jun. 7, 2002 (JP) .............................. 2002-167634

(51) Int. Cl.
*G01S 13/40* (2006.01)
*G01S 13/08* (2006.01)
*G01S 13/89* (2006.01)
*G01S 13/93* (2006.01)

(52) U.S. Cl. .................... 342/131; 342/70; 342/118; 342/128; 342/129; 342/130; 342/175; 342/176; 342/179; 342/195; 342/196

(58) Field of Classification Search ........ 180/167–169; 701/300, 301; 342/27, 28, 70–72, 175, 176, 342/179, 195–197, 118–145, 165–174
See application file for complete search history.

(56) References Cited

U.S. PATENT DOCUMENTS

| 1,993,326 | A | * | 3/1935 | Hart ............................ 342/122 |
| 2,011,392 | A | * | 8/1935 | Bentley ....................... 342/122 |
| 2,050,418 | A | * | 8/1936 | Boerner ....................... 342/122 |
| 2,151,323 | A | * | 3/1939 | Hollmann ................... 342/128 |
| 2,222,586 | A | * | 11/1940 | Sanders, Jr. ................ 342/122 |

(Continued)

FOREIGN PATENT DOCUMENTS

JP        39-23284        10/1964

(Continued)

*Primary Examiner*—Bernarr E. Gregory
(74) *Attorney, Agent, or Firm*—Wenderoth, Lind & Ponack, L.L.P.

(57) ABSTRACT

A distance can be measured with high resolution. A frequency controller (7) controls a voltage control oscillator (2) so as to change a signal source frequency f in a range containing two center frequencies f1 and f2 and transmits it as a traveling wave from an antenna (4) to a target (5). A reflected wave reflected by the target (5) and the traveling wave interfere each other and form a standing wave. A power detector (6) detects power corresponding to the amplitude of the standing wave and performs Fourier transform based on the two center frequencies f1 and f2 in Fourier transform means (11, 12), respectively, thereby calculating radar image functions P1(x), P2(x). The distance d to the target (5) satisfies the conditions that the phase difference of the two radar image functions zero-crosses and the amplitude of the radar image functions becomes maximum. The zero cross point of the phase difference is a zero cross point of a linear function and can be identified with high resolution.

8 Claims, 7 Drawing Sheets

U.S. PATENT DOCUMENTS

| | | | |
|---|---|---|---|
| 2,222,587 A * | 11/1940 | Sanders, Jr. | 342/122 |
| 2,248,599 A * | 7/1941 | Alexanderson | 342/128 |
| 2,259,982 A * | 10/1941 | Alexanderson et al. | 342/129 |
| 6,115,651 A * | 9/2000 | Cruz | 342/70 |
| 6,795,014 B1 * | 9/2004 | Cheong | 342/118 |
| 6,903,677 B1 * | 6/2005 | Takashima et al. | 342/70 |
| 2004/0119966 A1 | 6/2004 | Iritani et al. | |

FOREIGN PATENT DOCUMENTS

| | | |
|---|---|---|
| JP | 59-142485 | 8/1984 |
| JP | 62-108176 | 5/1987 |
| JP | 3-144306 | 6/1991 |
| JP | 5-281341 | 10/1993 |
| JP | 10-239426 | 9/1998 |
| JP | 11-230734 | 8/1999 |
| JP | 2002-357656 | 12/2002 |
| WO | 99/13293 | 3/1999 |

* cited by examiner

FIG. 1(a)

RADAR IMAGE FUNCTIONS P1(x)    P2(x)

DISTANCE MEASUREMENT METHOD AND DEVICE

TECHNICAL FIELD

The present invention relates to a distance measuring method capable of measuring, in a non-contacting manner by the use of standing wave, a distance to an object to be measured.

BACKGROUND ART

Hitherto distance measurement is one of basic physical quantities measurements, and many methods have heretofore been employed therefor. "Distance" is equal to "length" in a physical dimension and they are often overlapped in concept. When an object to be measured is measured by a measuring instrument without bringing the measuring instrument into contact thereto, the measurement is often considered to be a "distance", while, when the object is measured by a measuring instrument which is brought into contact thereto, the measurement is often considered to be a "length". A basic instrument for measurement of length is a rule, which is graduated according to a predetermined reference.

Japanese Unexamined patent Publication JP-A-3-144306 (1991) discloses a prior art related to a length-measuring instrument in which a slit is formed in a waveguide so as to extend in the axial direction, electromagnetic standing waves are generated in the waveguide, and a slider which inserts a plurality of probes from the outside into the inside of the waveguide through the slit is moved in the axial direction to find the position of the slider based on the amplitude of the standing waves detected by the probes.

The present applicant further discloses in Japanese Unexamined Patent Publication JP-A-11-230734 (1999) a prior art related to a linear encoder in which standing waves are formed in a linear conductor passage with the use of frequency-modulated waves whose frequency periodically changes, and the layer position of the conductor passage is measured based on a correlation between the modulated signals and the envelope of standing waves in the conductor passage.

The present inventors have further discovered that electromagnetic standing waves can be formed in a propagation medium such as space that exists relative to an object to be measured, have developed the idea of using the standing waves applied to the conductor passage in Japanese Unexamined Patent Publication JP-A-11-230734 (1999), and have proposed in Japanese Patent Application No. 2001-237280 a technology capable of measuring the distance in a non-contacting manner.

In the prior arts disclosed in Japanese Unexamined Patent Publication JP-A-3-144306 (1991) and JP-A-11-230734 (1999), the waveguide or the conductor passage corresponding to the rule is installed between a position that serves as a reference of measurement and the object to be measured, and must be brought into mechanical contact with the object to be measured. The technology proposed in Japanese Patent Application No. 2001-237280 uses standing waves which are formed in electromagnetic waves or the like whose propagation medium is, for example, space, and accordingly it is made possible to measure a distance to an object in a non-contacting manner. Therefore, this technology can be utilized as a radar which is mounted on a mobile body such as an automobile.

According to the technology proposed in Japanese Patent Application No. 2001-237280, the frequency of electromagnetic waves or the like for generating the standing waves is varied to find a detection signal function that represents a relationship between the amplitude of the detected standing waves and the frequency, and a frequency at which the detection signal function assumes an extreme value is related to a distance to the object to be measured. As will be described later, however, changes in the detection signal function decrease near the extreme value, and it becomes difficult to correctly specify the position of the extreme value with the result that enhancement of resolution has its limitation. In the practical measurement, further, noise components are overlapped on the detection signal function, and the error range of the position of the extreme value which is specified based on the amplitude data only tends to increase.

Even if it is attempted to utilize the data related to the phase, the phase includes a phase shift quantity due to the reflection by the object to be measured, which makes it, usually, difficult to correctly find a phase shift quantity and hence it is necessary to be considered as being an unknown quantity. In the detection signal function, further, changes in phase constitute a periodic function of a short period as compared to changes in amplitude, and there exist a plurality of phases having a predetermined relationship to the phase shift quantity even near the extreme value of amplitude. Therefore, it is difficult to specify the extreme value of amplitude though the phase shift quantity can be correctly found.

DISCLOSURE OF THE INVENTION

It is therefore an object of the invention to provide a distance measuring method capable of measuring a distance with high resolution and an apparatus therefor.

The invention is a distance measuring method for measuring a distance from a reference position to an object to be measured, comprising the steps of:

a standing wave generating step for generating traveling waves that travel from the reference position to the object to be measured in a propagation medium existing surrounding the reference position and the object to be measured while varying the frequency, and causing the generated traveling waves to interfere with the waves reflected by the object to be measured to thereby generate standing waves;

a standing wave detecting step for detecting the standing waves generated in the standing wave generating step;

a radar image calculating step for calculating a plurality of radar image functions from the standing waves detected in the standing wave detecting step based on a plurality of different center frequencies in which radar image functions a variable is a distance from the reference position to a point on an imaginary linear axis passing through the object to be measured; and a distance judging step for judging, as the distance from the reference position to the object to be measured, a distance in which predetermined conditions are satisfied by phase differences among a plurality of radar image functions calculated in the radar image calculating step and by an amplitude of any of the radar image functions.

Furthermore, the invention is characterized in that an object to be measured for which a distance is measured and an object to be measured that serves as a reference for measuring the distance are simultaneously measured.

The invention is a distance measuring apparatus for measuring a distance from a reference position to an object to be measured, comprising:

traveling wave generating means for generating traveling waves that travel from the reference position to the object to be measured in a propagation medium existing surrounding the reference position and the object to be measured while varying the frequency;

standing wave detecting means for detecting the standing waves which are generated by interference of traveling waves generated by the traveling wave generating means, with waves which are reflected by the object to be measured and return to the traveling wave generating means side, and thereby deriving signals corresponding to the standing waves;

radar image calculating means for calculating a plurality of radar image functions based on a plurality of different center frequencies by operating the signals corresponding to the standing waves derived from the standing wave detecting means in which radar image functions a variable is a distance from the reference position to a point on an imaginary linear axis passing through the object to be measured; and distance judging means for judging, as the distance from the reference position to the object to be measured, a distance in which predetermined conditions are satisfied by phase differences among a plurality of radar image functions calculated by the radar image calculating means and by the amplitude of any of radar image functions.

Furthermore, the invention is characterized in that the radar image calculating means calculates the plurality of radar image functions based on a Fourier transform processing; and the distance judging means judges, as the distance in which the above predetermined conditions are satisfied, a distance in which a phase difference between at least two radar images functions is 0 or is a radian value of an even number of times of the pi π, and the amplitude of at least any one of the radar image functions is an extreme value.

Furthermore the invention is characterized in that the radar image calculating means calculates the plurality of radar image functions by subjecting the signals corresponding to the standing waves to the Fourier transform processing with a variable common width for the plurality of different center frequencies by using a predetermined window function.

Furthermore the invention is characterized in that the traveling wave generating means includes:

an oscillator capable of controlling oscillation frequency and of generating high-frequency signals;

a controller for periodically varying the oscillation frequency of the oscillator within a predetermined range; and an antenna for transmitting high-frequency signals from the oscillator as electromagnetic traveling waves into space which is the propagation medium; and the standing wave detecting means detects the standing waves by using the antenna.

BRIEF DESCRIPTION OF THE DRAWINGS

Other and further objects, features, and advantages of the invention will be more explicit from the following detailed description taken with reference to the drawings wherein.

BEST MODE FOR CARRYING OUT THE INVENTION

Now referring to the drawings, preferred embodiments of the invention are described below.

Figure 1A:
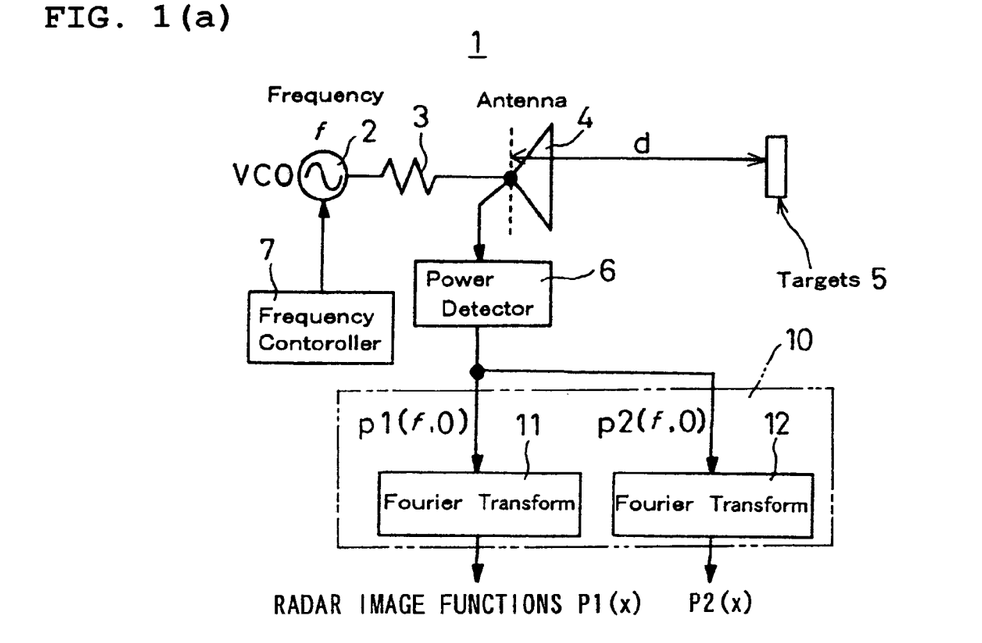
FIG. 1(a) is a block diagram schematically illustrating an electric constitution of a distance measuring apparatus 1 according to an embodiment of the invention.

FIG. 1(a) schematically illustrates a constitution for measuring a distance according to an embodiment of the invention. The distance measuring apparatus 1 is capable of varying the oscillation frequency depending upon a voltage applied from an external unit, and a Voltage Controlled Oscillator (abbreviated as VCO) 2 generates electric signals of a high frequency, which are fed to an antenna 4 through a transmission system 3 which effects the power amplification and impedance matching. The antenna 4 converts electric signals of a high frequency that are fed into electromagnetic waves which are transmitted into the surrounding space. In case where a target 5 which is an object to be measured exists at a distance d from the antenna 4 in a direction in which the electromagnetic waves travel being transmitted from the antenna 4, standing waves generate due to the interference between the traveling waves incident on the target 5 and the waves reflected by the target 5. The antenna 4 receives the electric signals corresponding to the standing waves, and the electric power of the standing waves is detected as a square power of the received input voltage by a power detector 6 as standing wave detecting means. The oscillation frequency of the voltage controlled oscillator 2 is varied by a control voltage given by a frequency controller 7. The frequency of high-frequency signals generated from the voltage controlled oscillator 2 can be directly used, multiplied into a frequency of a plurality of times as high, or can be heterodyne-converted. The voltage controlled oscillator 2, antenna 4 and frequency controller 7 serves as traveling wave generating means.

The power of the standing waves detected by the power detector 6 is converted into a radar image function by radar image calculating means 10. The radar image calculating means 10 includes a plurality of or, for example, two Fourier transform means 11 and 12. A first Fourier transform means 11 is related to a first center frequency f1 between the center frequencies f1 and f2, and converts a power function p1(f, 0) into a radar image function P1(x). A second Fourier transform means 12 is related to a second center frequency f2, and converts a power function p2(f, 0) into a radar image function P2(x).

The radar image calculating means 10 can be operated as a plurality of Fourier operation means 11, 12 by a program processing using a general-purpose central processing unit (CPU). It can be further operated at a high speed by using a digital signal processor (DSP). The operation processing can be effected at a further high speed by operating a plurality of digital signal processors in parallel. The speed can be further increased by forming a circuit dedicated to the Fourier operation processing.

Figure 2A:
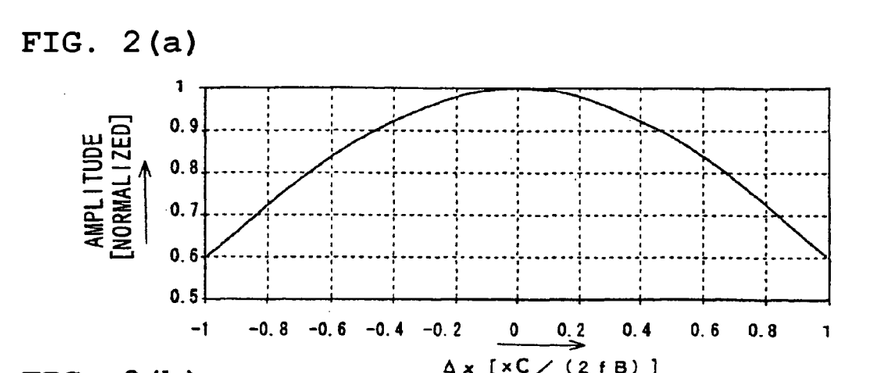
FIGS. 2(a)–2(c) are graphs illustrating changes in the amplitude and in the phase angle used for specifying a distance to a target 5 by the distance measuring apparatus 1 of FIG. 1(a)
Figure 2B:
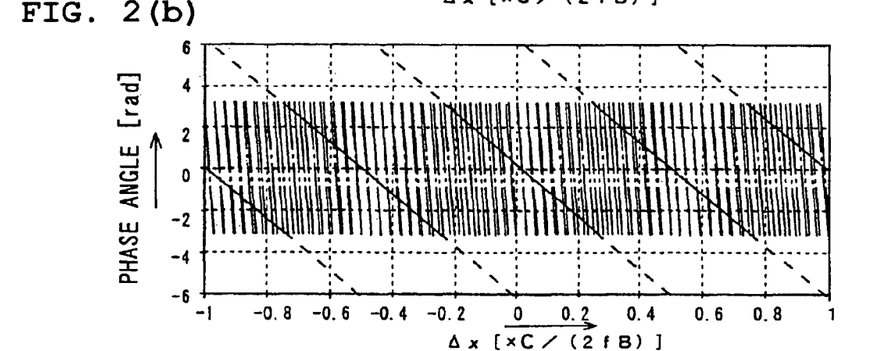
Figure 2C:
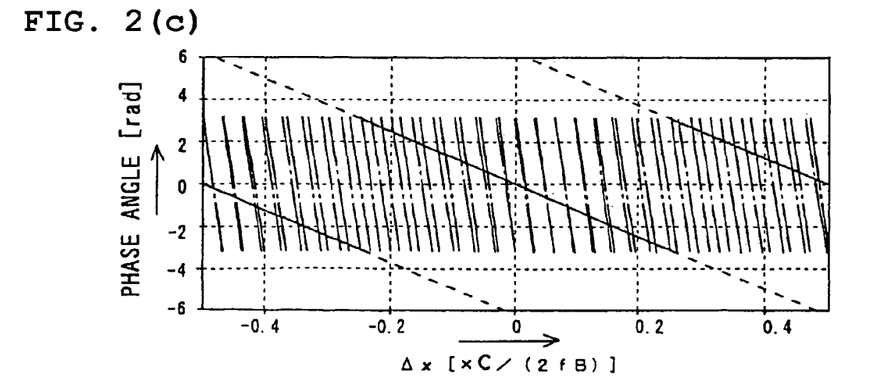

FIGS. 2(a)–2(c) illustrates conditions for specifying the position of the target 15 according to the embodiment. FIG. 2(a) illustrates changes in the amplitude of two radar image functions P1(x) and P2(x) in a standardized manner. FIG. 2(b) illustrates changes in the phases θ1 and θ2 of two radar image functions P1 and P2 using a dot-dash chain line and a two-dot chain line, a solid line representing a change in the phase difference Δθ. In FIGS. 2(a) and 2(b), the abscissa represents a relative displacement Δx with x=d as a center in a unit of c/2fB. FIG. 2(c) illustrates a change near Δx=0 in FIG. 2(b) being enlarged in the direction of abscissa. In this embodiment, even when a maximum peak of amplitude mildly varies as illustrated in FIG. 2(a), the distance to the target 15 can be specified as a position at where Δθ=0 correctly with high resolution as illustrated in FIGS. 2(b) and 2(c).

FIGS. 3(a) to 7(b) illustrates a principle for specifying a distance to the target 15 which is the object to be measured according to the embodiment of the invention. The basic idea of this principle has been disclosed in Japanese Patent application No. 2001-237280.

Figure 3A:
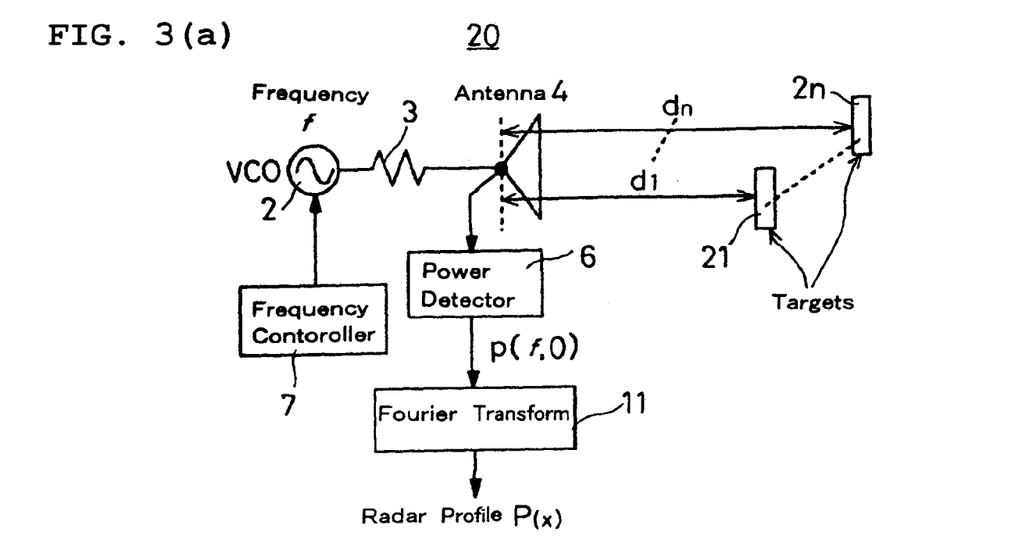
FIG. 3(a) is a block diagram schematically illustrating an electric constitution of a distance measuring apparatus 20 which serves as a base of the invention.
Figure 3B:
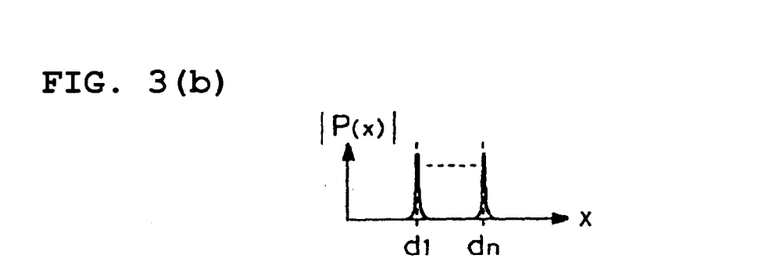
FIG. 3(b) is a graph illustrating a change in the amplitude of a radar image function for a change in the position on the x-axis.

In FIG. 3(a), an electric constitution of the distance measuring apparatus 20 that serves as a basis of the invention is illustrated, and in FIG. 3(b), a change in the amplitude of the radar image function is illustrated. In FIG. 3(a), the portions corresponding to those of the embodiment of FIG. 1(a) are denoted by the same reference numerals, but their description is not repeated. FIG. 3(a) illustrates a case of simultaneously measuring the distances d1 to dn to a plurality of targets 21 to 2n instead of using one target 5 as the object to be measured of FIG. 1(a).

The electromagnetic wave signals transmitted from the antenna 4 become traveling waves traveling the space toward the targets 21 to 2n. The traveling waves are reflected by the targets 21 to 2n. Here, it has been widely known that the reflected waves that return back to the antenna 4 interfere with the traveling waves to form standing waves. Due to the presence of the standing waves, the amplitude and electric power of signals observed at points on the x-axes which are imaginary straight lines passing through the plurality of targets 21 to 2n from the antenna 4, undergo a periodic change relative to the frequency f of the traveling waves from the signal source. The period is inversely proportional to the distance from a point of observation where x=0 to the object to be measured. By utilizing this property of the standing waves, the distance measuring apparatus 20 measures the distance d to the object to be measured with the power-feeding portion of the antenna 4 as a point of observation.

The traveling waves VT which are the signals transmitted from the antenna 4 are expressed by the following formula (1), $$VT(f, x) = e^{j\frac{2\pi f}{c}x} \quad (1)$$

In case where the distances from the point of observation to relative targets 21 to 2n which are the objects to be measured are denoted by d1 to dn, then, the reflected waves VRk from the targets 2k (k=1, 2, . . . , n) are expressed by the following formula (2), $$VRk(f, x) = \gamma k \cdot e^{j\phi k} \cdot e^{j\frac{2\pi f}{c}(2dk-x)} \quad (2)$$

where c is a velocity of electromagnetic waves, i.e., velocity of light, γk is a magnitude of reflection coefficient inclusive of propagation loss, and φk is a phase shift quantity in the reflection without including phase shift due to the propagation.

The standing waves are generated by the additional synthesis of the traveling waves VT and the reflected waves VRk, and from the formulas (1) and (2), a power function p(f, x) which is a square power thereof is found from the following formula (3), $$\begin{aligned}p(f, x) &= \left|VT(f, x) + \sum_{k=1}^{n} VRk(f, x)\right|^2 \\ &= \left|e^{j\frac{2\pi f}{c}x}\left\{1 + \sum_{k=1}^{n}\gamma k \cdot e^{j\left(\frac{4\pi(dk-x)}{c}f + \phi k\right)}\right\}\right|^2 \\ &= \left\{1 + \sum_{k=1}^{n}\gamma k \cdot \cos\left(\frac{4\pi(dk-x)}{c}f + \phi k\right)\right\}^2 + \\ &\quad \left\{\sum_{k=1}^{n}\gamma k \cdot \sin\left(\frac{4\pi(dk-x)}{c}f + \phi k\right)\right\}^2\end{aligned} \quad (3)$$

Figure 4:
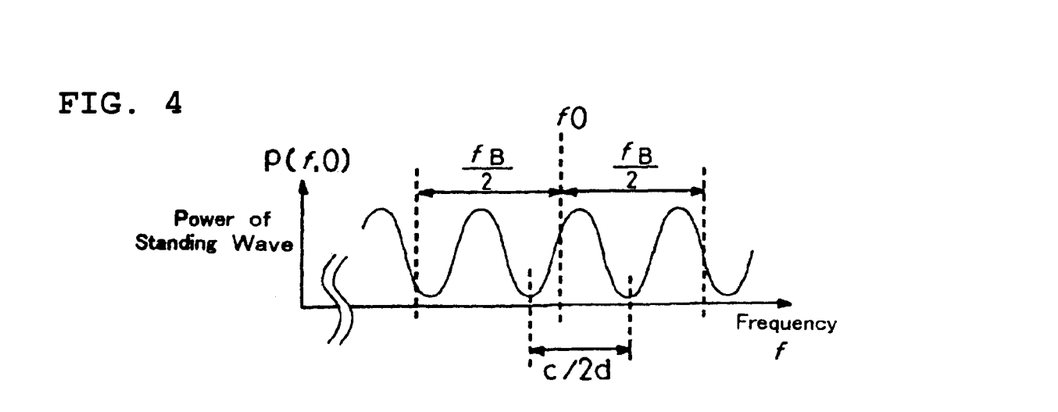
FIG. 4 is a graph illustrating a change in the amplitude of standing waves relative to the frequency f in the distance measuring apparatus 1 of FIG. 3(a)

FIG. 4 illustrates a relationship between the frequency f of the signal source and the power function p(f, 0) of the standing waves at the power-feeding portion of the antenna 4 which is the point of observation where x=0 when there is one object to be measured at a position of the distance d, in compliance with the formula (3). It will be learned that p(f, 0) periodically varies relative to the frequency f of the signal source, and its period is c/(2d) which is in inverse proportion to the distance d from the point of observation to the object to be measured.

In order to find the periodic data possessed by p(f, 0) that is observed, therefore, p(f, 0) is regarded to be time waveform and is put to the Fourier transform. By replacing ω/(2π) by 2x/c and t by f in the Fourier transform formula, $$F(\omega) = \int_{-\infty}^{+\infty} f(t)e^{-j\omega t}dt \quad (4)$$

the Fourier-transformed P(x) of p(f, 0) can be expressed by the following formula (5), $$P(x) = \int_{-\infty}^{+\infty} p(f, 0)e^{-j\frac{4\pi x}{c}f} df \quad (5)$$

In practice, the range for varying the frequency f of the signal source is finite and in case where its center frequency is denoted by f0 and the width of variation by fB, then, the radar image function P(x) can be found from the following formula (6), $$P(x) = \int_{f0-fB/2}^{f0+fB/2} w(f - f0) \cdot p(f, 0)e^{-j\frac{4\pi x}{c}f} df \quad (6)$$

where w(f) is a window function, and there can be favorably used the Blackman-Harris window expressed by the following formula (7), $$w(f) = \left\{0.423 + 0.498\cos\left(2\pi\frac{f}{fB}\right) + 0.0792\cos\left(4\pi\frac{f}{fB}\right)\right\} \quad (7)$$

The DC component of p(f, 0) has no data and may have been removed in advance. Further, at the point of observation where x=0 which is the power-feeding portion of the antenna 4, the signal level of the reflected waves VRk is, usually, very smaller than that of the traveling waves VT, and it is considered that γk<<1. The polynomial of γk can be neglected presuming that the secondary and higher terms of γk are almost 0. In case where these conditions are added, then, from the formula (3), p(f, 0) can be expressed as given by the following formula (8), $$P(f, 0) \approx 2\sum_{k=1}^{n} \gamma k \cdot \cos\left(\frac{4\pi dk}{v}f + \phi k\right) \quad (8)$$

From the formulas (6), (7) and (8), the radar image function P(x) can be calculated as given by the following formula (9), $$P(x) = \int_{f0-fB/2}^{f0+fB/2} w(f - f0) \cdot p(f, 0)e^{-j\frac{4\pi x}{c}f} df \quad (9)$$

$$= \sum \left\{\gamma k \cdot W(x - dk)e^{j\phi k} e^{-j\frac{4\pi f0}{c}(x-dk)} + \gamma k \cdot W(x + dk)e^{-j\phi k} e^{-j\frac{4\pi f0}{c}(x+dk)}\right\}$$

Figure 5:
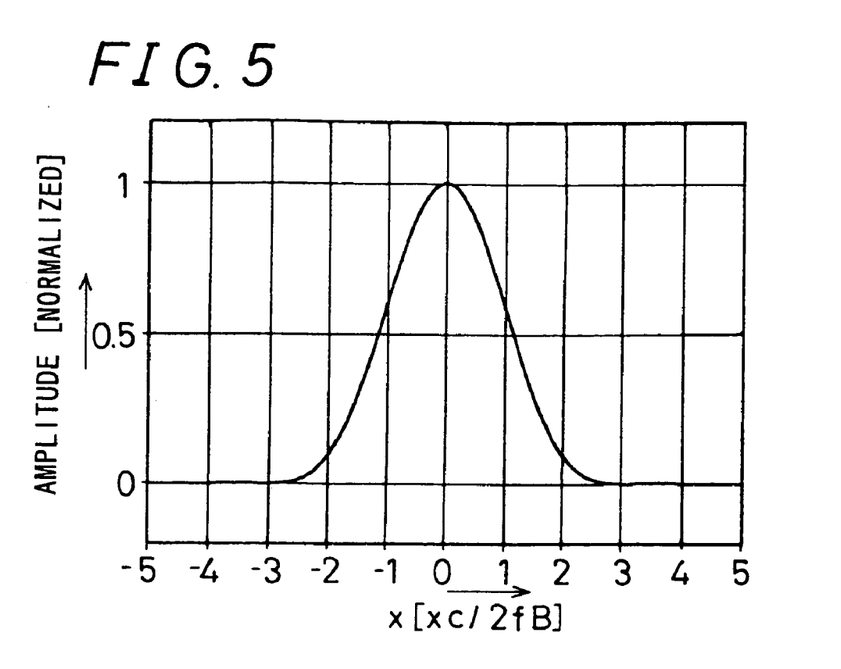
FIG. 5 is a graph illustrating a functional waveform obtained by Fourier-transforming a window function used by the distance measuring apparatus 1 of FIG. 3(a)

FIG. 5 shows the shape of a normalized function of W(x) used for the formula (9). W(x) is a Fourier transform of the window function w(x) and can be expressed by the following formula (10) when the Blackman-Harris window of the formula (7) is used, $$P(x) = \int_{f0-fB/2}^{f0+fB/2} w(f)e^{-j\frac{4\pi x}{c}f} df \quad (10)$$

$$= 0.423 \, fB \cdot Sa\left(\frac{2\pi fB \cdot x}{c}\right) +$$

-continued $$0.249 \, fB\left\{Sa\left(\frac{2\pi fB \cdot x}{c} - \pi\right) + Sa\left(\frac{2\pi fB \cdot x}{c} + \pi\right)\right\} +$$

$$0.0396 \, fB\left\{Sa\left(\frac{2\pi fB \cdot x}{c} - 2\pi\right) + Sa\left(\frac{2\pi fB \cdot x}{c} + 2\pi\right)\right\}$$

where Sa is a sampling function which is expressed by the following formula (11), $$Sa(\tau) = \frac{\sin(\tau)}{\tau} \quad (11)$$

Figure 6:
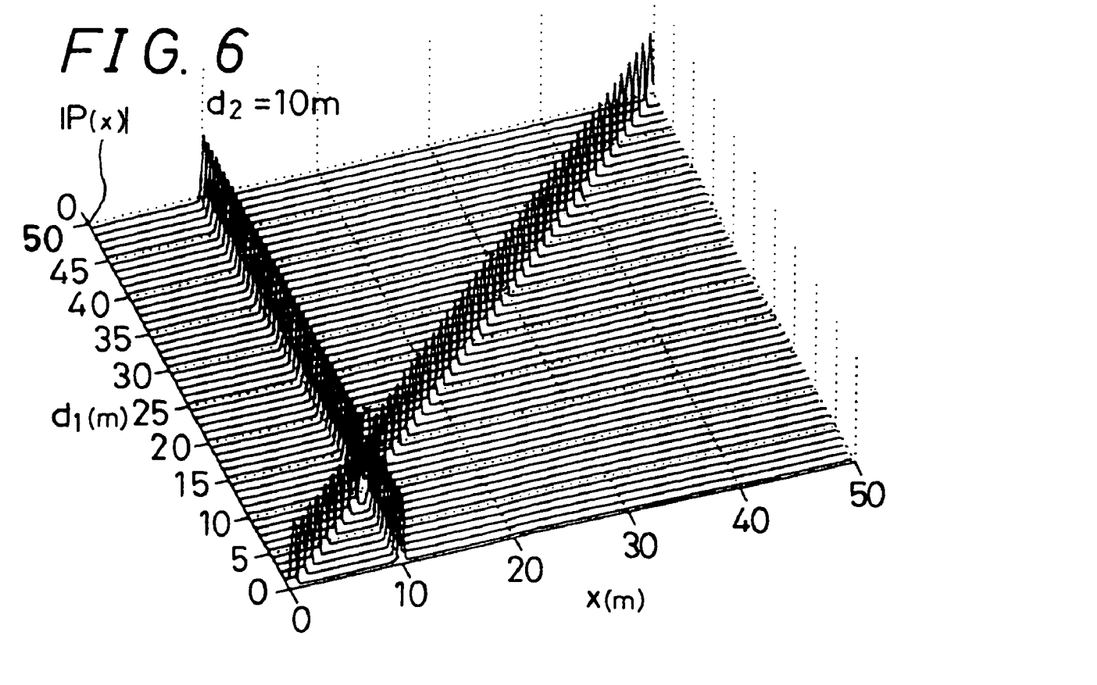
FIG. 6 is a graph illustrating the results of when a moving target and a fixed target are simultaneously measured by the distance measuring apparatus 20 of FIG. 3(a)

FIG. 6 illustrates the calculated results of absolute values |P(x)| of the radar image function P(x) of when the distance d1 of one target 21 between the two targets 21 and 21, is changed from 0.3 m to 50 m and the distance d2 of the other target 22 is fixed at 10 m, in a region where x>0. This is the case where the center frequency f0 is 7.75 GHz and fB is 500 MHz. Further, γk is set to be 0.1 and φk to be π. As p(f, 0), there is used the one obtained by removing the DC component from the formula (3). The results of calculation include secondary or higher terms of γk. It is also possible to simultaneously measure the distances to the plurality of targets 21, 22. In case where one distance d2 is measured in advance or later by other method, then, the other distance d1 can be corrected based on the measured value.

Considered below is a case where the problem is simplified by the distance measuring apparatus 20 of FIG. 3, and the distance d to any one of the targets 21 to 2n is judged from the point of observation where x=0. In case where the reflection coefficient including the propagation loss is denoted by γ and the phase shift quantity accompanying the reflection without including the phase shift due to propagation is denoted by φ, then, a radar image function P(x) is obtained as represented by the following formula (12) from the formula (9), $$P(x) = \gamma W(x - d)e^{j\phi}e^{-j\frac{4\pi f0}{c}(x-d)} + \gamma W(x + d)e^{-j\phi}e^{-j\frac{4\pi f0}{c}(x+d)} \quad (12)$$

Here, as shown in FIG. 5, in a region remote from the center where x=0 by more than 3xc/(2fB), W(x) can be regarded to be almost 0. This is because the Blackman-Harris window has such a property that the components other than the main portion become very small compared to other window functions. Therefore, in case where d>1.5xc/(2fB), then, W(x+d)≈0 near x=d, and the radar image function P(x) of the formula (12) can be approximated as given by the following formula (13), $$P(x) = \gamma W(x - d)e^{j\phi}e^{-j\frac{4\pi f0}{c}(x-d)} \quad (13)$$

Figure 7A:
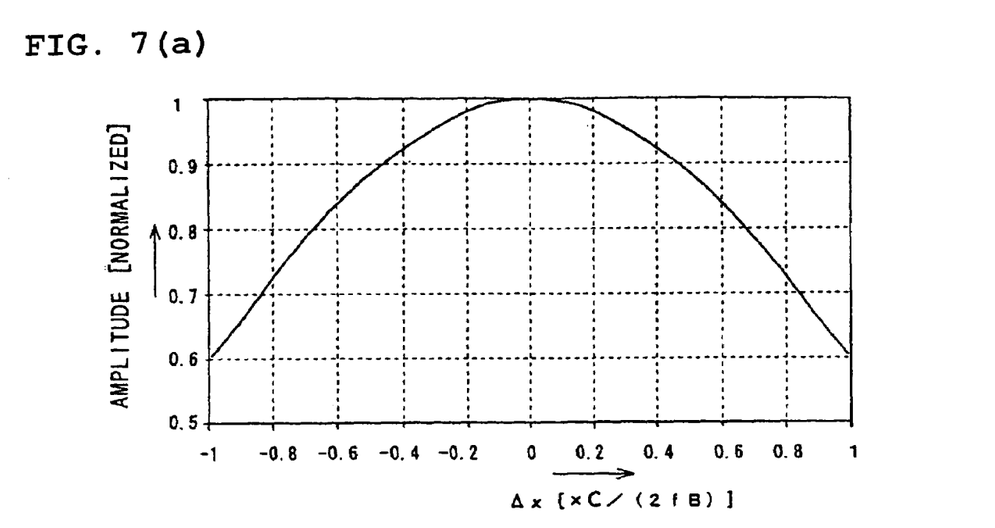
FIGS. 7(a) and 7(b) are graphs illustrating changes in the amplitude and in the phase angle used for specifying the distance to the target 5 using the distance measuring apparatus 1 of FIG. 3(a)
Figure 7B:
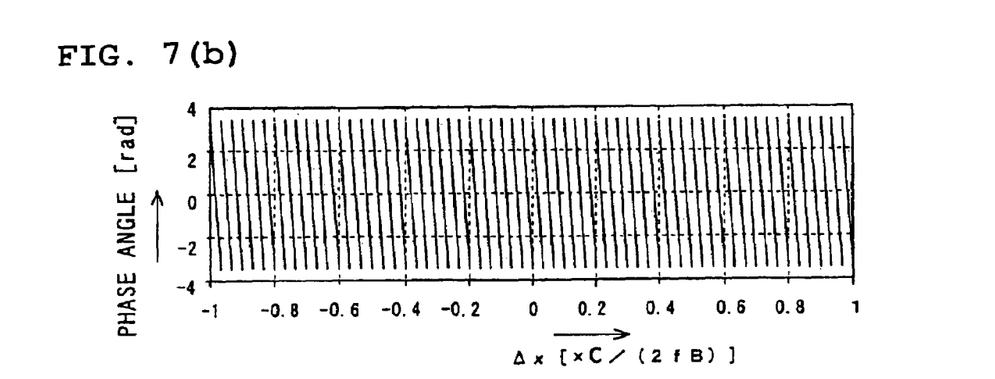

FIGS. 7(a) and 7(b) illustrate a partial shape near x=d of the radar image function P(x) for judging the distance d to any one of the targets 21 to 2n from the point of observation x=0 using the distance measuring apparatus 20 of FIG. 3(a) according to the formula (13). FIG. 7(a) illustrates a change in the normalized amplitude |P(x)|, and FIG. 7(b) illustrates a change in the phase ∠P(x) which is represented by radian vcalue. As described above, f0 is 7.75 GHz, and fB is set to be 258 MHz so that f0/fB=30. The abscissa represents the displacement Δx with x=d as a center in a unit of c/(2fB).

According to FIG. 7(a) and the formula (13), it will be understood that the distance d can be found by searching a point where the amplitude |P(x)| of the radar image function becomes a maximum or the phase ∠P(x) becomes equal to ϕ. However, the phase shift quantity ϕ is unknown and is displayed in FIG. 7(b) being folded in a range of ±π. Therefore, even if a value ϕ is found within a range of −π≦ϕ<+π, a plurality of displacements Δx are corresponded thereto, and the distance d cannot be judged. The amplitude |P(x)| of the radar image function changes like a mild mountain, and it is difficult to accurately specify a maximum position and there is a limit in conducting the measurement with high resolution. Besides, in the practical measurement, random noise is superposed making it further difficult to judge a maximum position. In case where the phase shifting amount ϕ is known at least in the range of −π≦ϕ<+π, then, the distance d can be specified in case where the conditions of phase ∠P(x)=ϕ and the amplitude |P(x)| are satisfied. However, the phase ∠P(x) sharply changes and is corresponded to a plurality of displacements Δx near a maximum value of the amplitude |P(x)|, and assists little to specify the maximum position.

Figure 1B:
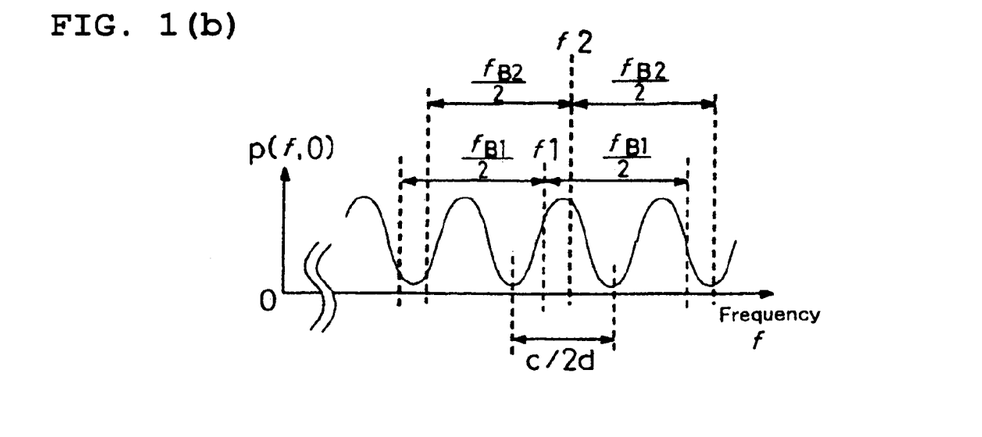
FIG. 1(b) is a graph illustrating a change in the amplitude of standing waves relative to the frequency f.

In the radar image calculating means 10 of the embodiment illustrated in FIG. 1(a), therefore, a plurality of different center frequencies f1, f2 are set as illustrated in FIG. 1(b), two radar image functions P1(x) and P2(x) are obtained by using two Fourier transform means 11 and 12, and a distance d is found from the amplitudes thereof and from the phase difference as illustrated in FIG. 2.

Figure 8:
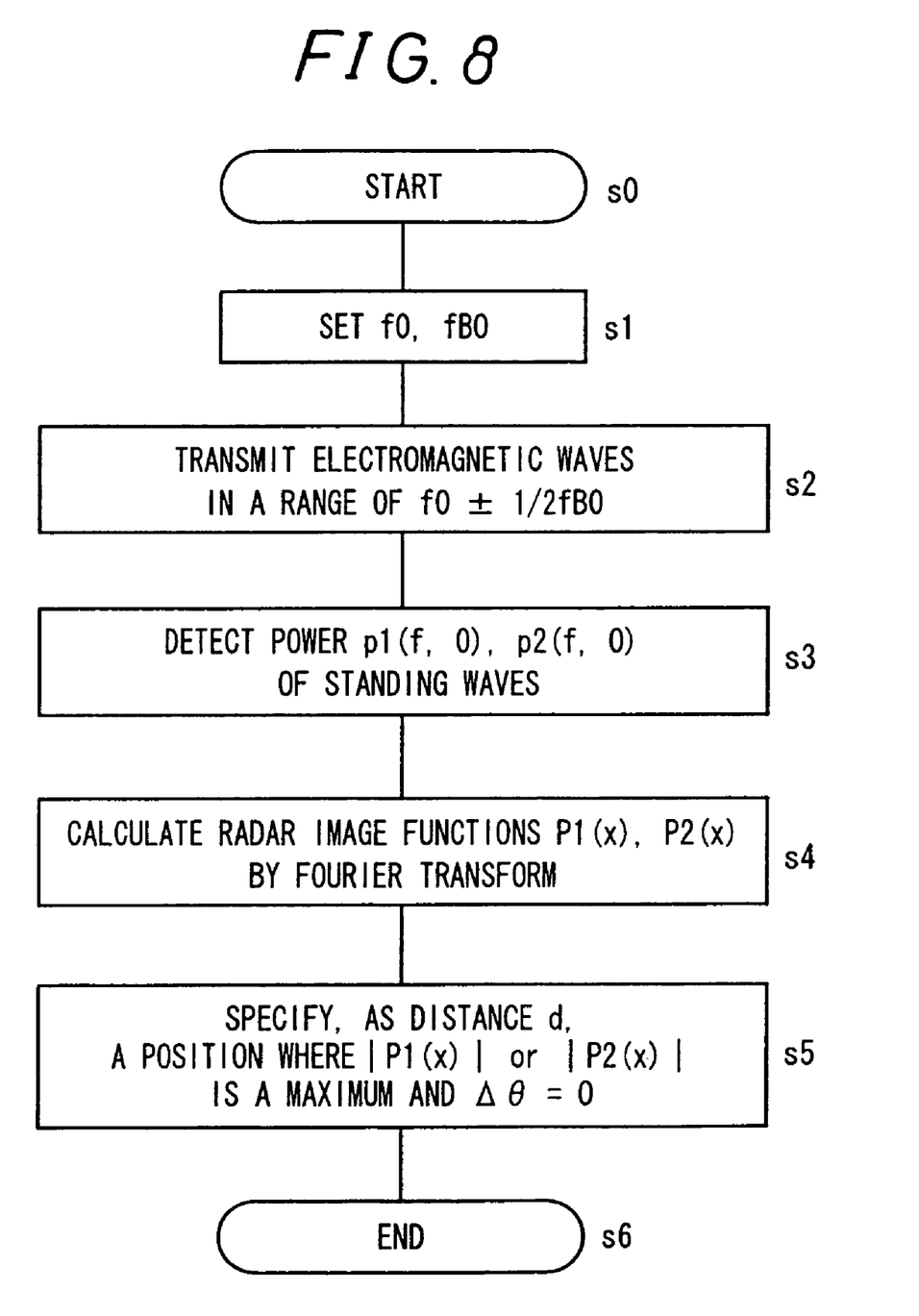
FIG. 8 is a flowchart illustrating a procedure for specifying the distance according to the embodiment of FIG. 1(a)

FIG. 8 schematically illustrates a procedure for specifying the distance d by the distance measuring apparatus 1 of this embodiment. The procedure starts with step s0. At step s1, the frequency controller 7 sets the center frequency f0 and the variable width fB0 of the voltage controlled oscillator 2 so as to oscillate it. At step s2, traveling waves are transmitted from the antenna 4, the frequency f of the signal source of which varying over a range of f0±½×fB0. The frequency of the signal source must remain stable for a period of time long enough for the reflected waves returning back to the antenna 4 to interfere with the traveling waves to form standing waves. However, the distance d is short as compared to the velocity c of light, and the required time is short. When the frequency controller 7 controls the oscillation frequency of the voltage controlled oscillator 2 in a digital manner, the frequency of the signal source changes stepwise sufficiently satisfying the time conditions for generating the standing waves.

At step s3, the power detector 6 detects the power p(f, 0) corresponding to the amplitude of the standing waves input to the antenna 4. In a range from the center frequency f0 to ±½×fB0, the reflection coefficient γ and the phase shift quantity ϕ can be regarded to be constant. At next step s4, the ranges f1±½×fB1 and f2±½×fB2 are picked up out of the detected power p(f, 0) as illustrated in FIG. 1(b), and are transformed into radar image functions P1(x) and P2(x) through the Fourier transform processing such as FFT (Fast Fourier Transfer) using the Fourier transform means 11 and 12. From the formula (13), the following formulas (14) and (15) are obtained. The two frequency ranges are selected by using band-pass filters or based on a time difference in the change of frequency by giving control signal related to the signal source frequency f to the Fourier transform means 11 and 12 from the frequency controller 7.

$$P1(x) = \gamma W(x-d)e^{j\phi}e^{-j\frac{4\pi f1}{c}(x-d)} \quad (14)$$

$$P2(x) = \gamma W(x-d)e^{j\phi}e^{-j\frac{4\pi f2}{c}(x-d)} \quad (15)$$

FIG. 2(a) illustrates normalized amplitudes of radar image functions P1(x) and P2(x) represented by the formulas (14) and (15). The amplitudes of the two radar image functions are the same. Depending upon the shape of the function corresponding to the standing waves, it can be considered that the amplitude assumes a minimum value at a position where the target exists. In FIGS. 2(b) and 2(c), changes in the phases θ1 and θ2 are represented by a dot-dash chain line and by a two-dot chain line when fB1=fB2=fB, f1/fB1=30, and f2/fB2=32, and changes in the phase difference Δθ=θ1−θ2 are represented by a solid line. The phase difference Δθ appears to be 0 crossing zero at a plurality of positions inclusive of x=d where Δx=0. In general, however, the phase difference Δθ=0 represents a phase difference which is an integer number of times of 2π. Therefore, there is obtained the following formula (16), $$\begin{aligned}\Delta\theta &= \theta1 - \theta2 \\ &= \angle P1(x) - \angle P2(x) \\ &= \frac{4\pi}{c} \times (x-d) \times (f2-f1) \\ &= 2\pi N \quad (N=0, \pm1, \pm2, \ldots)\end{aligned} \quad (16)$$

In case where Δθ=0 in the formula (16), then, a relation of the following formula (17) is derived, $$x = d + N\frac{c}{2(f2-f1)} \quad (17)$$

From the formula (17), it is learned that there exists a matching point in phase for every c/(2(f2−f1)) with x=d as a center. Among these matching points, a point satisfying a condition in which the amplitude of the radar image function represented by FIG. 2(a) becomes a maximum gives a distance d to the target 5. The phase difference Δθ between the two radar image functions P1(x) and P2(x) becomes a primary function for x near x=d, and makes it possible to judge a point where Δθ=0 with high precision. Even when random noise is existing, the zero-cross point of phase difference is single near the extreme value in the amplitude of the radar image function. Therefore, the phase difference is little affected by random noise, and the matching points in phase can be correctly judged.

At step s5 of FIG. 8, the distance d to the target 5 is specified, the target 5 being located at a position where the amplitude |P1(x)| or |P2(x)| of the radar image function is a maximum and the phase difference Δθ is 0 between the two radar image functions P1(x) and P2(x). The procedure ends at step s6. In this embodiment, power signals of the two center frequencies f1 and f2 are picked up from common power signals. The power signals, however, can also be detected by dividing the timing for detecting the standing waves by changing the frequency f of the signal source for each of the center frequencies f1 and f2.

Figure 9:
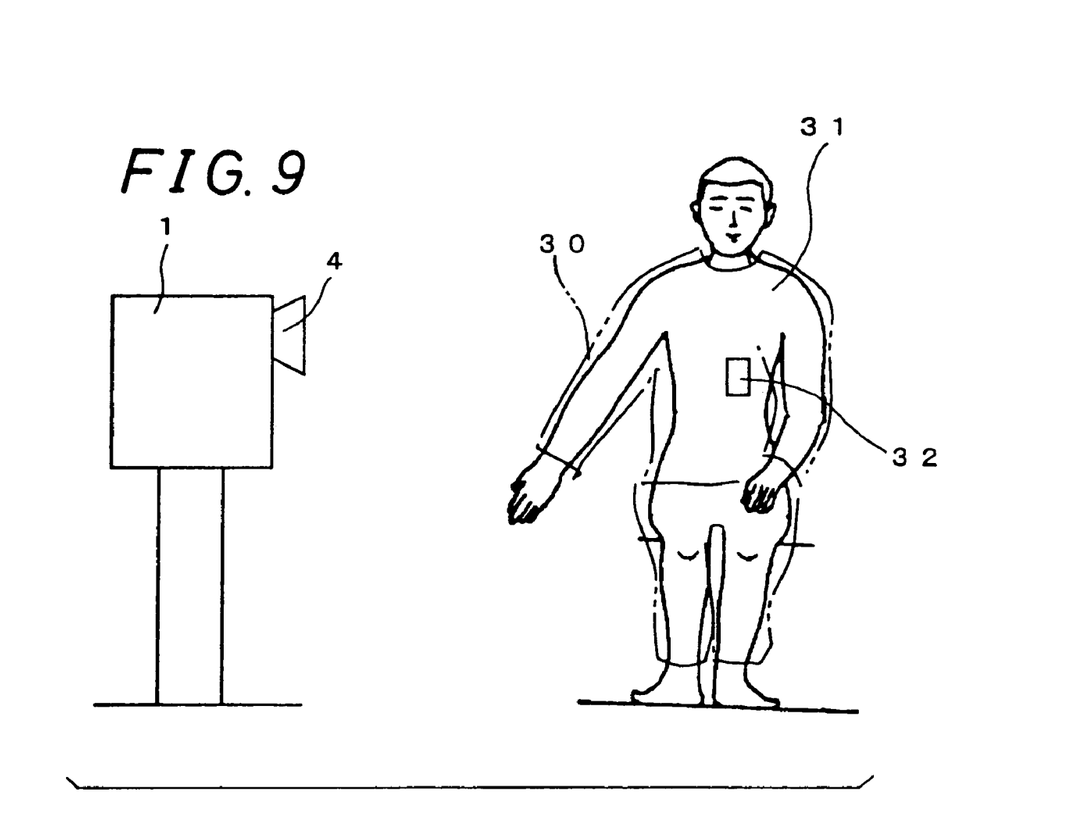
FIG. 9 is a view schematically illustrating a state where a human body 31 wearing clothes 30 is used as a target in the embodiment of FIG. 1(a).

FIG. 9 schematically illustrates a state of measuring, in a non-contacting manner, the distance to the surface of a human body 31 wearing clothes 30 by using the distance measuring apparatus 1 of this embodiment. The clothes 30 that is electrically insulating permits electromagnetic waves to pass through so as to be reflected by the surface of the human body 31 to thereby form standing waves. In this embodiment, the distance is highly precisely measured based on the standing waves; i.e., the distance is measured by correctly reflecting a distance between the clothes 30 and the surface of the skin of the human body 31. The size can be measured in case where the distance to the human body 31 is measured at a plurality of points. For example, even if it is attempted to measure the distance to the human body 31 wearing clothes 30 in a non-contacting manner relying upon the optical measurement, the surface shape only of the clothes 30 can be measured.

In order to measure a narrow portion such as a particular portion of the human body 31, the frequency of the signal source may be increased. It is considered the size of the region that can be measured is of the order of wavelength of electromagnetic waves. When the human body 31 is the object, the wavelength becomes 1 cm at 30 GHz. Therefore, a frequency of about 30 GHz to about 60 GHz may be used. The distance is short and can, hence, be measured even with a very small output.

The measurement illustrated in FIG. 9 is capable of detecting even an electrically conducting material 32 concealed under the clothes 30. In case where the electromagnetic waves for detection are scanned, the image of the material 32 can be formed.

The distance measuring apparatus 1 is capable of simultaneously measuring even a plurality of targets as illustrated in FIG. 3(a). The distances based on the phase differences can be judged with high resolution for a plurality of peaks of amplitude of the radar image function as illustrated in FIG. 3(b). The distance may be measured in advance by any other method using a target as a reference or may be measured later thereby to measure a distance to a target that is the object to be measured relying upon the distance to the target that serves as a reference with high precision.

The distance measuring apparatus 1 of this embodiment can further be used as a radar device proposed in Japanese Patent Application No. 2001-237280. Further, car-mounted sensors and road-side sensors that are for measuring the distances can be realized with high precision for realizing an intelligent traffic system (ITS). The apparatus can be further applied to a level gauge, a berthing instrument for ships, an altimeter of aircraft and landslide measuring instrument, that effect measurement in absolute values with high resolution.

The idea of the invention can be applied not only to electromagnetic waves using space as a propagation medium but also to sound waves using, for example, the air as a propagation medium. The speed of sound varies depending upon the temperature. By simultaneously measuring the target that serves as a reference, however, the distance to the object to be measured can be correctly measured even if the speed of sound is unknown. In a liquid such as in the water or in a solid such as in the soil, the liquid or the solid can be utilized as a propagation medium. On the boundary of the propagation medium such as on the liquid surface or on the ground surface, the standing waves generated on the surface waves can be utilized for measuring the distance. Further, when a wave motion of a short wavelength such as light is used, standing waves are generated not by using the wave motion of the electromagnetic waves but by using the wave motion which is a change in the amplitude, and are used for measuring the distance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention as described above, in the standing wave generating step, traveling waves that travel from the reference position to the object to be measured are generated in a propagation medium existing surrounding the reference position and the object to be measured while varying the frequency, and the generated traveling waves are caused to interfere with the waves reflected by the object to be measured to thereby generate standing waves. Therefore, a measuring instrument that corresponds to a rule needs not be brought into contact with the object to be measured, and the distance can be measured even to the object that is freely moving. The standing waves are detected in the standing wave detecting step, and a plurality of radar image functions are calculated from the detected standing waves based on a plurality of different center frequencies in which radar image functions a variable is a distance from the reference position to a point on an imaginary linear axis passing through the object to be measured in the radar image calculating step. When a difference among the center frequencies is small as compared to the absolute values of the center frequencies, the reflection by the object to be measured equally affects the calculated radar image functions. In the distance judging step, as the distance from the reference position to the object to be measured, a distance in which predetermined conditions are satisfied by phase differences among the plurality of radar image functions calculated in the radar image calculating step and by the amplitude of any radar image function, is judged. The effect of the phase shift due to the reflection by the object to be measured is canceled in the phase difference. Besides, the period of change in the phase difference is larger than a period of change in the phase of the radar image functions. Therefore, the distance in which the predetermined condition are satisfied by the amplitude of the radar image functions can be specified from a phase difference with high resolution.

Further, according to the invention an object to be measured for which a distance is measured and an object to be measured that serves as a reference for measuring the distance are simultaneously measured, and it is possible to determine a relative difference in the distances to the objects with high resolution. The distance to the object that serves as a reference for measuring the distance, is directly measured in advance or later and, based on this distance, the absolute distance to the object that is to be measured for its distance thereto is correctly judged in a non-contacting manner.

Further, according to the invention, traveling wave generating means generates traveling waves that travel from the reference position to the object to be measured in a propagation medium existing surrounding the reference position and the object to be measured while varying the frequency, to thereby generate standing waves in the propagation medium by the interference of the traveling waves with the waves reflected by the object to be measured. The standing wave detecting means detects the standing waves generated in the propagation medium. Therefore, a measuring instrument that corresponds to a ruler needs not be brought into contact with the object to be measured, and the distance can be measured even to the object that is freely moving. The radar image calculating means calculates a plurality of radar image functions from the standing waves detected by the standing wave detecting means based on a plurality of different center frequencies in which radar image functions a variable is a distance from the reference position to a point on an imaginary linear axis passing through the object to be measured. When a difference among the center frequencies is small as compared to the absolute values of the center frequencies, the reflection by the object to be measured equally affects the calculated radar image functions. The distance judging means judges, as the distance from the reference position to the object to be measured, a distance in which predetermined conditions are satisfied by phase differences among the plurality of radar image functions calculated by the radar image calculating means and by the amplitude of any radar image function. The effect of the phase shift due to the reflection by the object to be measured is canceled in the phase difference. Besides, the period of change in the phase difference is larger than a period of change in the phase of the respective radar image functions. Therefore, a distance in which the predetermined conditions are satisfied by the amplitude of the radar image functions can be specified from a phase difference with high resolution.

Further, according to the invention, the radar image calculating means calculates the plurality of radar image functions based on a Fourier transform processing and, hence, it is possible to calculate radar image functions, as complex functions of frequency space, including the effect of reflection by the object to be measured as a reflection coefficient for the amplitude together with a phase shift quantity, from the real time signals. The distance judging means judges, as the distance in which predetermined conditions are satisfied, a distance in which a phase difference between at least two radar image functions is 0 or a radian value of an even number of times of pi $\pi$, and the amplitude of at least any one of radar image functions is an extreme value. In case where the phase difference is considered in a range of $\pm\pi$ with $2\pi$ as a period, then, the distance can be judged based on a zero-cross position in the phase difference.

Further, according to the invention, the radar image calculating means calculates the plurality of radar image functions by subjecting the signals corresponding to the standing waves to the Fourier transform processing with a variable common width for the plurality of different center frequencies by using a predetermined window function. The range is finite for varying the frequency of traveling waves generated by the traveling wave generating means, and the frequency range is squeezed by the window function at the time of effecting the Fourier transform processing to easily carry out the Fourier transform processing.

According to the invention, further, the traveling wave generating means includes an oscillator capable of controlling oscillation frequency and of generating high-frequency signals, a controller for periodically varying the oscillation frequency of the oscillator within a predetermined range, and an antenna for transmitting high-frequency signals from the oscillator as electromagnetic traveling waves into space which is the propagation medium. It is, therefore, made possible to measure the distance in a non-contacting manner by utilizing ubiquitous space as a propagation medium. Materials that do not reflect electromagnetic waves are excluded from the objects to be measured. It is, therefore, made possible to measure the distance to the object to be measured such as a material that is concealed and a human body wearing clothes. The standing wave detecting means detects the standing waves by using the antenna for transmitting electromagnetic waves, and therefore, it is possible to carry out searching the object to be measured and measuring the distance thereto like the existing radar.

The invention claimed is:

1. A distance measuring method for measuring a distance from a reference position to an object to be measured, comprising the steps of:
a standing wave generating step for generating traveling waves that travel from the reference position to the object to be measured in a propagation medium existing surrounding the reference position and the object to be measured while varying the frequency, and causing the generated traveling waves to interfere with the waves reflected by the object to be measured to thereby generate standing waves;
a standing wave detecting step for detecting the standing waves generated in the standing wave generating step;
a radar image calculating step for calculating a plurality of radar image functions from the standing waves detected in the standing wave detecting step based on a plurality of different center frequencies in which radar image functions a variable is a distance from the reference position to a point on an imaginary linear axis passing through the object to be measured; and
a distance judging step for judging, as the distance from the reference position to the object to be measured, a distance in which predetermined conditions are satisfied by phase differences among a plurality of radar image functions calculated in the radar image calculating step and by an amplitude of any of the radar image functions.

2. The distance measuring method of claim 1, wherein an object to be measured for which a distance is measured and an object to be measured that serves as a reference for measuring the distance are simultaneously measured.

3. A distance measuring apparatus for measuring a distance from a reference position to an object to be measured, comprising:
traveling wave generating means for generating traveling waves that travel from the reference position to the object to be measured in a propagation medium existing surrounding the reference position and the object to be measured while varying the frequency;
standing wave detecting means for detecting the standing waves which are generated by interference of traveling waves generated by the traveling wave generating means, with waves which are reflected by the object to be measured and return to the traveling wave generating means side, and thereby deriving signals corresponding to the standing waves;
radar image calculating means for calculating a plurality of radar image functions based on a plurality of different center frequencies by operating the signals corresponding to the standing waves derived from the standing wave detecting means in which radar image functions a variable is a distance from the reference position to a point on an imaginary linear axis passing through the object to be measured; and distance judging means for judging, as the distance from the reference position to the object to be measured, distance in which predetermined conditions are satisfied by phase differences among a plurality of radar image functions calculated by the radar image calculating means and by the amplitude of any of radar image functions.

4. The distance measuring apparatus of claim 3, wherein the radar image calculating means calculates the plurality of radar image functions based on a Fourier transform processing; and the distance judging means judges, as the distance in which the above predetermined conditions are satisfied, a distance in which a phase difference between at least two radar images functions is 0 or is a radian value of an even number of times of the pi $\pi$, and the amplitude of at least any one of the radar image functions is an extreme value.

5. The distance measuring apparatus of claim 4, wherein the radar image calculating means calculates the plurality of radar image functions by subjecting the signals corresponding to the standing waves to the Fourier transform processing with a variable common width for the plurality of different center frequencies by using a predetermined window function.

6. The distance measuring apparatus of claim 5, wherein the traveling wave generating means includes:
   an oscillator capable of controlling oscillation frequency and of generating high-frequency signals;
   a controller for periodically varying the oscillation frequency of the oscillator within a predetermined range; and
   an antenna for transmitting high-frequency signals from the oscillator as electromagnetic traveling waves into space which the propagation medium; and
   the standing wave detecting means detects the standing waves by using the antenna.

7. The distance measuring apparatus of claim 4, wherein the traveling wave generating means includes:
   an oscillator capable of controlling oscillation frequency and of generating high-frequency signals;
   a controller for periodically varying the oscillation frequency of the oscillator within a predetermined range; and
   an antenna for transmitting high-frequency signals from the oscillator as electromagnetic traveling waves into space which the propagation medium; and
   the standing wave detecting means detects the standing waves by using the antenna.

8. The distance measuring apparatus of claim 3, wherein the traveling wave generating means includes:
   an oscillator capable of controlling oscillation frequency and of generating high-frequency signals;
   a controller for periodically varying the oscillation frequency of the oscillator within a predetermined range; and
   an antenna for transmitting high-frequency signals from the oscillator as electromagnetic traveling waves into space which the propagation medium; and
   the standing wave detecting means detects the standing waves by using the antenna.

* * * * *